(12) United States Patent
Park

(10) Patent No.: US 11,420,112 B2
(45) Date of Patent: Aug. 23, 2022

(54) SYSTEM AND METHOD FOR OPERATING MATCH-UP GAME

(71) Applicant: No Sun Park, Seoul (KR)

(72) Inventor: No Sun Park, Seoul (KR)

( * ) Notice: Subject to any disclaimer, the term of this patent is extended or adjusted under 35 U.S.C. 154(b) by 0 days.

(21) Appl. No.: 16/999,658

(22) Filed: Aug. 21, 2020

(65) Prior Publication Data

US 2021/0052979 A1 Feb. 25, 2021

(30) Foreign Application Priority Data

Aug. 23, 2019 (KR) ........................ 10-2019-0103749

(51) Int. Cl.
| *A63F 13/28* | (2014.01) |
| *A63F 13/837* | (2014.01) |
| *A63F 13/44* | (2014.01) |
| *A63F 13/245* | (2014.01) |
| *A63F 13/26* | (2014.01) |

(52) U.S. Cl.
CPC ............ *A63F 13/28* (2014.09); *A63F 13/245* (2014.09); *A63F 13/26* (2014.09); *A63F 13/44* (2014.09); *A63F 13/837* (2014.09); *A63F 2300/1043* (2013.01); *A63F 2300/301* (2013.01); *A63F 2300/302* (2013.01); *A63F 2300/638* (2013.01); *A63F 2300/8076* (2013.01)

(58) Field of Classification Search
CPC ........ A63F 13/245; A63F 13/25; A63F 13/28; A63F 13/40; A63F 13/44–46; A63F 13/52; A63F 13/837; A63F 13/843; A63F 2250/05; A63F 2300/302; A63F 2300/638; A63F 2300/663; A63F 2300/8094

See application file for complete search history.

(56) References Cited

U.S. PATENT DOCUMENTS

| 2008/0090659 A1* | 4/2008 | Aguilar ................... A63F 13/85 463/42 |
| 2018/0151035 A1* | 5/2018 | Maalouf ................. G06F 3/017 |
| 2019/0172265 A1* | 6/2019 | Cossairt ................ A63F 13/213 |

FOREIGN PATENT DOCUMENTS

KR 20030027510 4/2003

* cited by examiner

*Primary Examiner* — Omkar A Deodhar
(74) *Attorney, Agent, or Firm* — Fish & Richardson P.C.

(57) ABSTRACT

The system for operating a match-up game includes a display unit having a plurality of player screen regions configured to display game screens a first input unit configured to receive an input from a first player a second input unit configured to receive an input from a second player a first air outlet configured to discharge air to the first player a second air outlet configured to discharge air to the second player; a control unit configured to control the display unit to count a game time and change the game screens displayed on the player screen regions for each counted game time, and when receiving an input to the first input unit from the first player, control the second air outlet so as to discharge air corresponding to the received input. The system for operating a match-up game may increase a player's sense of immersion.

14 Claims, 7 Drawing Sheets

SYSTEM AND METHOD FOR OPERATING MATCH-UP GAME

RELATED APPLICATIONS

This application claims priority to Korean Patent Application No. 10-2019-0103749, filed on Aug. 23, 2019 in the Korean Intellectual Property Office, the entire disclosure of which is incorporated herein by reference.

BACKGROUND OF THE INVENTION

1. Field of the Invention

The present invention relates to a system and a method for operating a match-up game, and more specifically, to a game system related technique capable of increasing a player's sense of immersion by expressing an interaction occurring between players within the match-up game using screens and air adjustment units which are separated for each user.

2. Description of the Related Art

Among game machines, there is a game machine in a form of a gun shooting in which a player aims at a target character appearing on a game screen with a gun or other equipment to clear the same. Recently, as a game market using mobile devices such as smartphones has grown by leaps and bounds, games using fixed physical game facilities have decreased in popularity compared to the past. However, in the case of gun shooting games, there is a unique feature that players face enemies on the screen using a gun-type controller, thus despite the growth of the mobile game market, the gun shooting games are still loved by many players.

In this regard, the conventional gun shooting game has a simple form in which a target character appearing on the screen is aimed at with a gun-type controller and a fire button is pressed. Therefore, a method for performing the game is fragmentary, and there is a limitation in that it is difficult to have an interaction between players not the game characters. In addition, the conventional gun shooting game relies only on visual and auditory contents in delivering game experiences to the players, such that the players tend to lose interest in the game.

PRIOR ART DOCUMENT

Patent Document (Patent Document 1) Korean Patent Laid-Open Publication No. 2003-0027510

SUMMARY OF THE INVENTION

An object of the present invention is to provide a system and a method for operating a match-up game capable of increasing a player's sense of immersion by expressing an interaction occurring between players within the match-up game using screens and air adjustment units which are separated for each user.

According to an aspect of the present invention, there is provided a system for operating a match-up game including a display unit which has a plurality of player screen regions configured to display game screens a first input unit configured to receive an input from a first player a second input unit configured to receive an input from a second player a first air outlet configured to discharge air to the first player a second air outlet configured to discharge air to the second player; a control unit configured to control the display unit to count a game time and change the game screens displayed on the player screen regions for each counted game time, and when receiving an input to the first input unit from the first player, control the second air outlet so as to discharge air corresponding to the received input.

In one embodiment, the control unit is further configured to increase a size of an area in which an opponent player is displayed on game scree of the player screen region as the counted game time elapses.

In one embodiment, the control unit is further configured to change one or more of a pressure, a volume, and a discharge radius of the air discharged through the second air outlet corresponding to the received input as the counted game time elapses.

In one embodiment, the first input unit includes a controller which is grasped by a player, and a sensor configured to measure a relative position of the controller with respect to the display unit. Herein, the control unit is further configured to change one or more of a pressure, a volume, and a discharge radius of the air discharged through the second air outlet, based on the relative position of the controller with respect to the display unit at the time of receiving the input by the first input unit.

In one embodiment, the plurality of player screen regions include a first player screen region and a second player screen region, and the control unit is further configured to change a display form of an opponent player on the second player screen region in response to receiving the input by the first input unit.

In one embodiment, the control unit is further configured to change one or more of a pressure, a volume, and a discharge radius of the air discharged through the second air outlet corresponding to the input of the first player, based on a game difficulty in the system for operating a match-up game by the second player.

According to another aspect of the present invention, there is provided a method for operating a match-up game including displaying game screens on a plurality of player screen regions included in a display unit of a system for operating a match-up game counting a game time and changing the game screens displayed on the player screen regions of the display unit for each counted game time, by the system for operating a match-up game receiving, by the system for operating a match-up game, an input from a first player through an input unit of the system for operating a match-up game; discharging, by the system for operating a match-up game, air to a second player through an air outlet of the system for operating a match-up game corresponding to the input.

In one embodiment, the step of changing the game screen displayed on the player screen region of the display unit includes increasing, by the system for operating a match-up game, a size of an area in which an opponent player is displayed on game scree of the player screen region as the counted game time elapses.

In one embodiment, the step of discharging air to the second player includes changing, by the system for operating a match-up game, one or more of a pressure, a volume, and a discharge radius of the air discharged through the air outlet corresponding to the received input as the counted game time elapses.

In one embodiment, the input unit includes a controller which is grasped by a player, and a sensor configured to measure a relative position of the controller with respect to the display unit. Herein, the step of discharging air to the second player includes changing, by the system for operating a match-up game, one or more of a pressure, a volume, and a discharge radius of the air discharged through the air outlet, based on the relative position of the controller with respect to the display unit at the time of receiving the input by the input unit.

In one embodiment, the plurality of player screen regions include a first player screen region and a second player screen region. Herein, the method for operating a match-up game according to an embodiment further includes changing, by the system for operating a match-up game, a display form of an opponent player on the second player screen region in response to receiving the input by the first input unit.

In one embodiment, the method further includes receiving, by the system for operating a match-up game, a game difficulty from the second player. Herein, the step of discharging air to the second player includes changing, by the system for operating a match-up game, one or more of a pressure, a volume, and a discharge radius of the air discharged through the air outlet corresponding to the input of the first player, based on the input game difficulty.

In accordance with the system and the method for operating a match-up game according to an aspect of the present invention, by expressing the interaction occurring between players within the match-up game using the screens and air adjustment units which are separated for each user, the player's sense of immersion and tension for the game may be increased, and the progress of the game may be variously changed through the interaction between the players, thereby allowing the players to continuously maintain an interest in the game.

In addition, in accordance with the system and the method for operating a match-up game according to an aspect of the present invention, by changing the pressure, volume, and/or discharge radius of the air discharged through the air outlet to the opponent player corresponding to the input of the player, based on the progress time of the game or the game difficulty set by each player, it is possible to appropriately adjust the degree of interaction experienced by the user according to the situation of the game.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, embodiments of the present invention will be described in detail with reference to the accompanying drawings.

Figure 1:
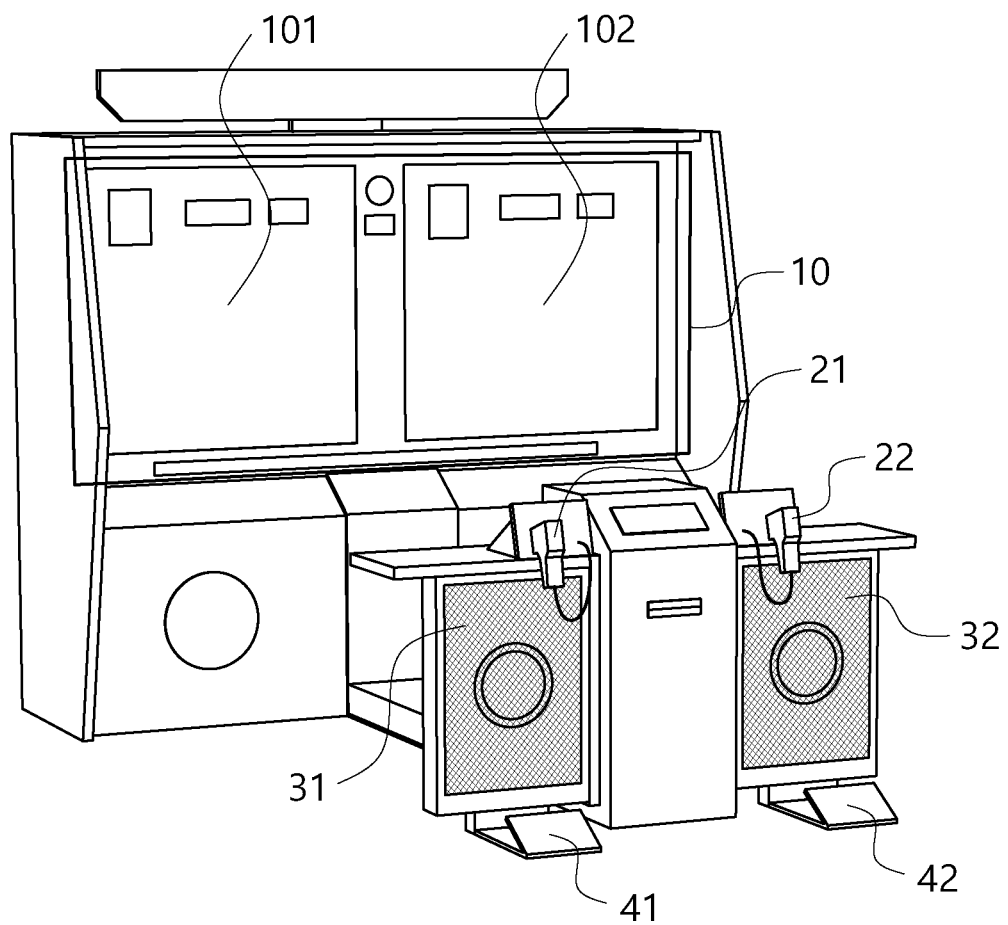
FIG. 1 is a perspective view illustrating a configuration of a system for operating a match-up game according to an embodiment of the present invention.

FIG. 1 is a perspective view illustrating a configuration of a system for operating a match-up game according to an embodiment of the present invention.

Referring to FIG. 1, the system for operating a match-up game according to the present embodiment includes a display unit 10 including a plurality of player screen regions configured to display game screens thereon. For example, the display unit 10 includes a first player screen region 101 and a second player screen region 102, and may display the game screens on these screen regions. In the present disclosure, the configuration of the system for operating a match-up game according to embodiments will be described by assuming a game in which two players compete against each other, but in other embodiments, it is also possible to play a game with each other of three or more players using the system for operating a match-up game.

In addition, the system for operating a match-up game according to the present embodiment includes input units for receiving operation inputs of each player. In a case of a game configured to be played by two players, the system for operating a match-up game may have a first input unit including a first controller 21 and a second input unit including a second controller 22. At this time, each of the controllers 21 and 22 may be grasped by the players and may have, for example, a gun or pistol type controller (e.g., a gun controller).

Further, each of the controllers 21 and 22 is configured to be able to measure a position where the controller 21 or 22 is aimed with respect to the display unit 10. For example, the controllers 21 and 22 include sensors capable of measuring a specific scan line displayed on the display unit 10, and when the controller 21 or 22 detects the scan line, a signal (e.g., a pulse, etc.) corresponding to the detection result is transmitted to a control unit (not illustrated). Therefore, it is possible to specify that the controller 21 or 22 aimed at any position on the display unit 10 based on the position of the scanning line at the time transmitting the corresponding signal. However, this is an exemplary device, and in other embodiments, the controllers 21 and 22 may be a device capable of measuring the aiming position in another different manner known in the art or to be developed in the future.

In one embodiment, the first input unit for receiving a signal from a first player may further include a foot pedal 41 in addition to the gun controller 21. Likewise, the second input unit for receiving a signal from a second player may further include a foot pedal 42. The foot pedals 41 and 42 are components used by each player to interact within the game in a different form other than shooting to the screen by a gun. For example, it may be configured that, when the player steps on the foot pedal 41 or 42, the characters of the players in the game perform a stealth or cover operation. However, the operation in the game by the foot pedals 41 and 42 is not limited thereto.

In addition, the system for operating a match-up game according to the present embodiment includes air outlets 31 and 32 for discharging air to each player as the game goes on. For a game configured to be played by two players, the system for operating a match-up game may include a first air outlet 31 and a second air outlet 32. Each of the air outlets 31 and 32 is configured to discharge air to the player to an extent that the player playing the match-up game can feel it. A pressure, volume and/or discharge radius of air discharged through the air outlets 31 and 32 may be controlled according to the progress of the game.

Further, in order to provide a game-related experience to the player playing the game, the system for operating a match-up game according to an embodiment may further include other components such as one or more speakers, one or more lighting devices, and/or one or more vibration devices, which are not illustrated in the drawings. Since these components should be easily understood by those skilled art from a conventional match-up game machine, it will not be described in detail herein in order to clarify the gist of the invention.

The system for operating a match-up game according to embodiments of the present invention includes the control unit (not illustrated) for adjusting a game screen displayed on the display unit 10 based at least in part on an operation input of each player. The progress of the game displayed on the display unit 10 is made by a control of the control unit, which will be described in detail below with reference to FIG. 2.

Figure 2:
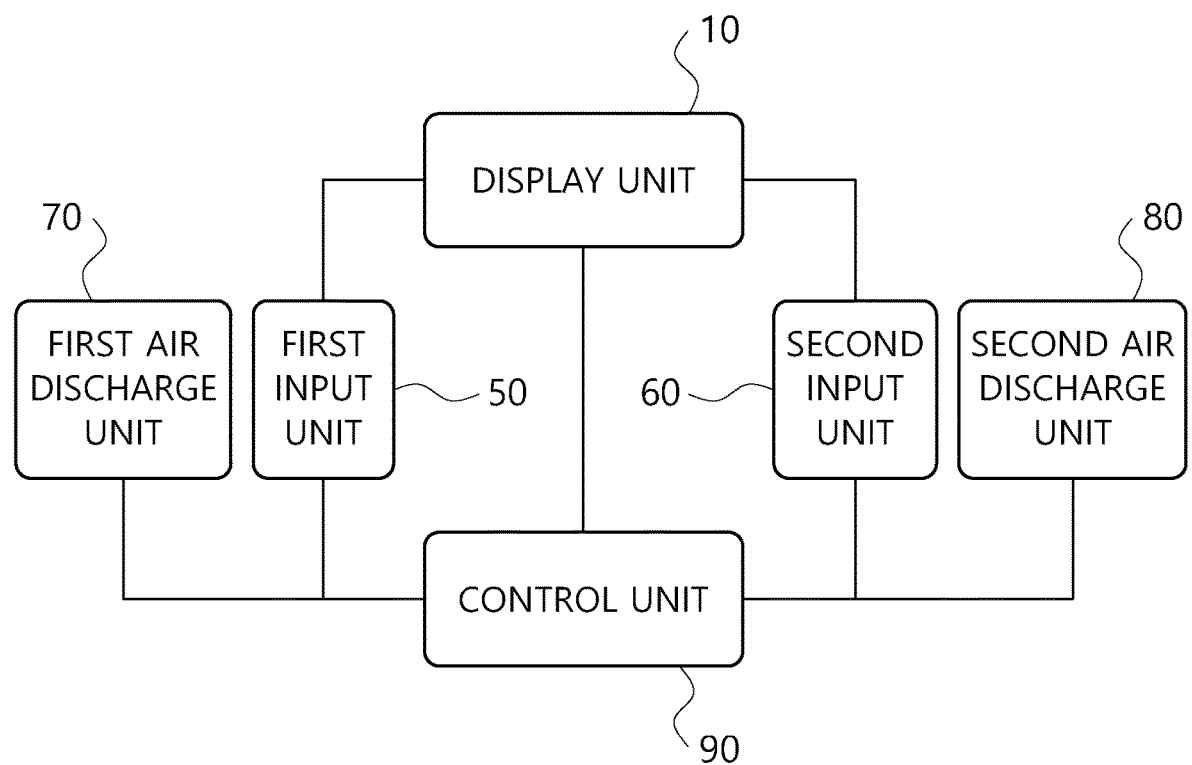
FIG. 2 is a schematic block diagram of the system for operating a match-up game according to an embodiment of the present invention.

FIG. 2 is a schematic block diagram of the system for operating a match-up game according to an embodiment of the present invention.

Referring to FIG. 2, the system for operating a match-up game according to the present embodiment includes the display unit 10, first and second input units 50 and 60, first and second air discharge units 70 and 80, and a control unit 90 for controlling operations of these components. The first input unit 50 may include the first controller 21 and/or the foot pedal 41 shown in FIG. 1, and likewise the second input unit 60 may include the second controller 22 and/or the foot pedal 42 shown in FIG. 1. In addition, the first air discharge unit 70 may include a compressed air reservoir, a nozzle, a control valve, and the like for discharging air through the air outlet 31, as well as the air outlet 31 shown in FIG. 1. Similarly, the second air discharge unit 80 may also include a compressed air reservoir, a nozzle, a control valve, and the like, as well as the air outlet 32 shown in FIG. 1.

That is, each of the units 10, 50, 60, 70, 80, and 90 shown in FIG. 2 may have an aspect which is entirely hardware, or partially hardware and partially software. In this case, the software may control the units or devices so as to send and receive data in a specific format and content in an electronic communication manner. In the present disclosure, terms such as a "unit," "module," "server," "system," "platform," "device" or "terminal" are intended to refer to a combination of hardware and software driven by the hardware. For example, the hardware herein may be a data processing device including a CPU or other processor. In addition, the software driven by the hardware may refer to an executing process, object, executable file, thread of execution, program and the like.

The control unit 90 controls the display unit 10 so as to display game screens corresponding to the game content previously stored in the system for operating a match-up game on the player screen regions thereof, thereby allowing players to progress a game. When the players start the game, the control unit 90 may control the display unit 10 so as to count a game time after starting the game and change the game screens displayed on the player screen regions for each counted game time. For example, in the case of a game type in which two players compete while approaching each other, the control unit 90 may configure the game so that a distance between the respective characters in the game is decreased as the game time elapses, and a size of the character of the opponent player displayed on the screen is increased as the distance between the respective players is decreased, thereby allowing the players to recognize the distance between the respective characters through the game screen.

At this time, the control unit 90 may control the air discharge units 70 and 80 so that air is discharged to the opponent player according to an attack input by any one of the players competing against each other through the input units 50 and 60. For example, it may be configured in such a way that, when the first player presses a firing button on the gun controller of the first input unit 50, air is discharged to the second player through the second air discharge unit 80 on a side of the second player competing against the first player. Thereby, the interaction between the characters who shoot or are attacked in the game can be indirectly reproduced in the actual environment of the players through the air discharge.

In one embodiment, the control unit 90 may change the pressure, volume, and/or discharge radius of air to be discharged to the opponent player corresponding to each player's shooting as the game time elapses. For example, when a long time elapses after the game starts and the distance between the characters in the game corresponding to each player is close, if shots are fired by a player at a close distance, the opponent player attacked by the player may actually feel the distance between the characters in the game to be closer by discharging a higher pressure, a larger volume and/or a wider range of air than in the case of being attacked at a far distance.

In one embodiment, when each of the input units 50 and 60 includes the gun controller capable of measuring an aiming position with respect to the display unit 10 as described above, the control unit 90 may change the pressure, volume and/or discharge radius of the air to be discharged to the opponent player depending on the controller's aiming position at the time of receiving an input from the player. For example, when a player shoots a character of the opponent player in the game, when shooting a specific part (e.g., a head) of the character according to the shooting position, the opponent player may actually feel the degree of attacking of the character in the game to be stronger, by discharging a higher pressure, a larger volume and/or a wider range of air when shooting other body portions (e.g., torso, legs, etc.).

In one embodiment, the control unit 90 may change the pressure, volume, and/or discharge radius of air to be discharged to the attacked player when the opponent player shoots, based on a game difficulty of each player playing the game. At this time, the game difficulty may be directly selected by the player through each input unit 50 or 60 before the game starts, or may also be automatically determined based on a game history (e.g., the number of games played, game play time, accumulated value of wins and losses in the game) of each player managed through the control unit 90. Thereby, a player with a higher game level may actually feel the game difficulty of the game to be higher when shooting by discharging a higher pressure, a larger volume and/or a wider range of air than a beginner level player.

In one embodiment, when a specific player (e.g., a first player) shoots a character of an opponent player (e.g., a second player), the control unit 90 may control the display unit 10 to cause a change in a display form of the game screens displayed on the player screen regions, in addition to discharging the air to the attacked player through the air discharge units 70 and 80. For example, it is possible to display a state in which the character of the opponent player fires on the screen of the attacked player, and/or show a predetermined shape corresponding to the case in which his or her player is attacked.

FIGS. 3A to 3D are exemplary diagrams of screens illustrating user interfaces in the game screens by the system for operating a match-up game according to an embodiment of the present invention.

Figure 3A:
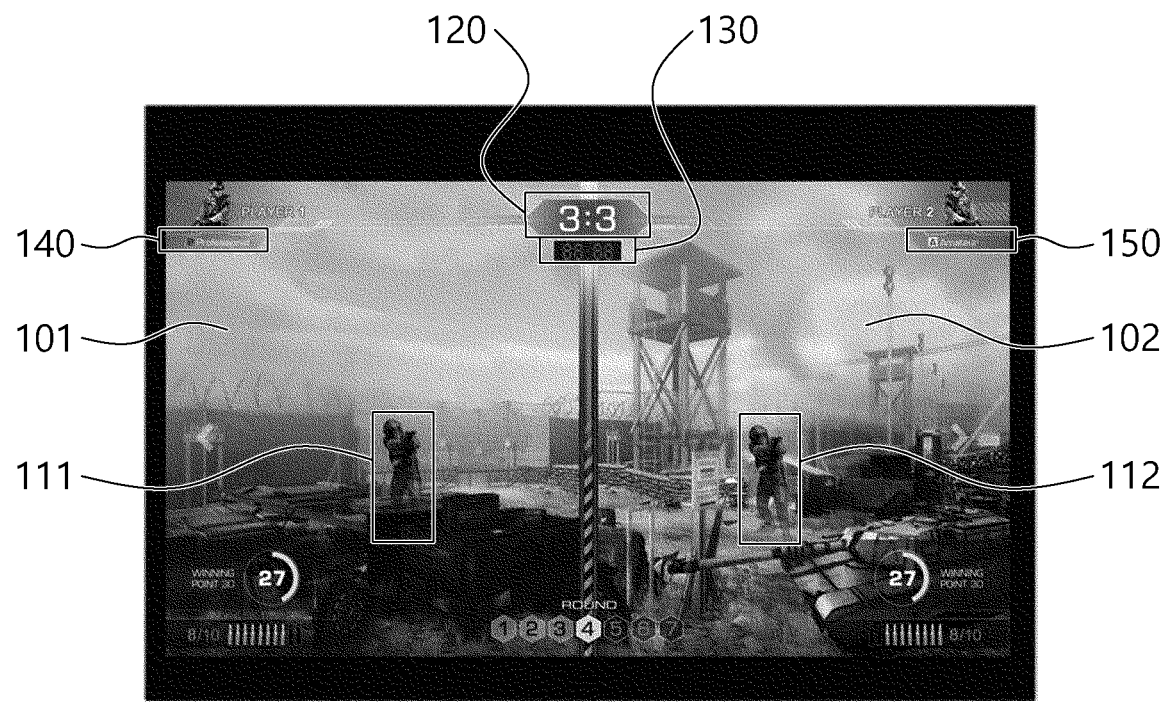
FIGS. 3A to 3D are exemplary diagrams of screens illustrating user interfaces in game screens by the system for operating a match-up game according to an embodiment of the present invention.

First, referring to FIG. 3A, the game screen includes a first player screen displayed on the first player screen region 101 and a second player screen displayed on second player screen region 102, wherein a character 111 corresponding to a second player who is an opponent of a first player may be displayed on the first player screen of the first player screen region 101, and a character 112 corresponding to the first player who is an opponent of the second player may be displayed on the second player screen of the second player screen region 102.

In one embodiment, game difficulty information 140 and 150 of a game played by the players may be further displayed on each player screen region 101 or 102. For example, the game difficulty may be divided into a beginner (e.g., amateur) mode and a master (e.g., professional) mode, but it is not limited thereto. The game mode defining the game difficulty may be selected by each player before the game starts, or may be automatically set based on the game history of each player.

In one embodiment, the display form of the game screens on the player screen regions 101 and 102 displayed to the players may be changed according to the game difficulty of each player. For example, in the case of a player playing in the beginner mode, by increasing the size of the opponent player character 111 or 112 displayed on the player screen region 101 or 102 compared to the master mode, it is possible to relatively easily shot the opponent player character 111 or 112.

In one embodiment, the game screen may include a score display area 120 to display scores according to the progress of each player's game. In addition, in one embodiment, the game screen may include a time display area 130 to display a time after the game starts. These display areas 120 and 130 may be located between the first player screen of the first player screen region 101 and the second player screen of the second player screen region 102, but it is not limited thereto. In addition, in other embodiments, the score and time are calculated internally in the game, but may not be displayed on the game screen.

The score displayed in the score display area 120 may be determined based on the number of times the player shoots and hits the character of the opponent player. For example, each time a player shoots and hits the character of the opponent player, the player's score may be added by one point. Further, in one embodiment, the score may be differently added according to the position where the character of the opponent player is hit. For example, according to the hit position, the score is composed of 10 points for the head, 7 points for the trunk, and 5 points for other body portions excluding the head and trunk, and then the match-up game may be configured to increase an expected result as the player hits a position that can cause fatal injuries in an actual environment.

Furthermore, the score displayed on the score display area 120 may be a score for each round. That is, winners and losers are determined among the players based on the scores of each player determined by the players who shoot or are attacked, and the process of determining the winners and losers is performed for each of a plurality of rounds, such that a winning round may be awarded 1 point, and a lost round may be awarded 0 points to determine the number of scores for each round among the players.

In addition, the game screens displayed to the players include various other information that affect the game, such as in-game equipment equipped by each player, the number of remaining shots of the in-game equipment, the score corresponding to a victory condition to be reached, and the number of rounds according to the game progress. Since these information should be easily understood by those skilled art from the conventional match-up games, it will not be described in detail in order to clarify the gist of the invention.

The control unit 90 (FIG. 2) may count the progress time after the game starts, and increase the size of the opponent player characters 111 and 112 displayed on the respective player screens of the player screen regions 101 and 102 according to the progress time. This is intended to visually display to the player that the distance between the characters in the game is decreased as the game time elapses after the game starts. When the distance between the characters in the game is less than or equal to a preset value, if a player aims at the opponent player character with the controller and operates the fire button, it may be processed as the opponent player is attacked by this operation. On the other hand, if the distance between the characters in the game exceeds the preset value, even if the players shoot each other, it may be processed as not being hit.

In the above example, the case, in which the control unit automatically decreases the distance between the characters in the game over time, has been described, but in other embodiments, it is also possible to directly control the distance between the characters in the game by each player using an input means (e.g., the foot pedals 41 and 42 of FIG. 1). For example, each player may moves forward or backward his or her character through the input means. If the character moves forward, the distance to the character of the opponent player is decreased, such that the character of the opponent player may be largely displayed on the game screen, while if the character moves backward, the distance to the character of the opponent player is increased, such that the character of the opponent player may be displayed small on the game screen.

Figure 3B:
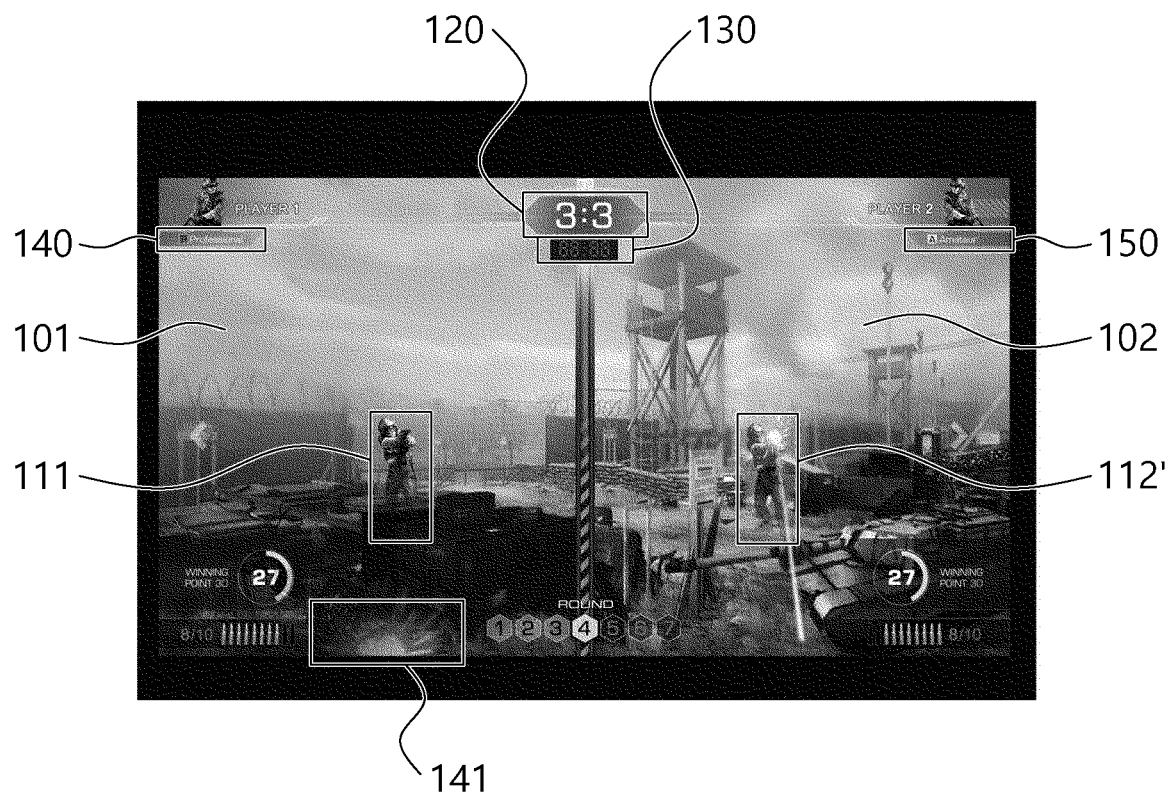

FIG. 3B illustrates a game screen when the first player shoots in the game state shown in FIG. 3A. As shown in FIG. 3B, as the first player shoots, a first player character 112' displayed on the second player screen of the second player screen region 102 is changed to a display form when shooting. In addition, according to this, a change in the display form such as displaying that the first player fired a gun on his or her first player screen region 101 may be changed. In the example shown in this drawing, an image in a form of a flame indicating shooting by the first player is displayed in a lower area 141 displayed on the first player screen of the first player screen region 101, but it is not limited thereto.

The system for operating a match-up game according to embodiments, as shown in FIG. 3B, when shooting is performed by the first player, air is discharged to the second player through the air outlet 32 (FIG. 1) in a direction of the second player toward the second player. At this time, the pressure, volume, and/or discharge radius of the discharged air may be determined based on the position (e.g., the head, trunk, or other body portions) where the first player shoots the second player's character, the distance between the first player's character and the second player's character in the game (or the display size of the opponent player character in the game screen), the game difficulty of each player and the like.

In one embodiment, the pressure, volume and/or discharge radius of the air discharged to the player may be determined by reflecting the above-described information in combination. For example, it is possible to control the air discharge units 70 and 80 (FIG. 2) in such a way that a higher injury score is awarded as an attacked location of the attacked character is a fatal location, and a higher injury score is awarded as the distance between the characters during shooting is close, and a higher injury score is awarded as the game difficulty corresponds to a high difficulty, then a final injury score is calculated by summing the injury scores determined based on the above factors, so that the higher the final injury score, the higher the pressure, volume, and/or discharge radius of air discharged to the attacked player.

Figure 3C:
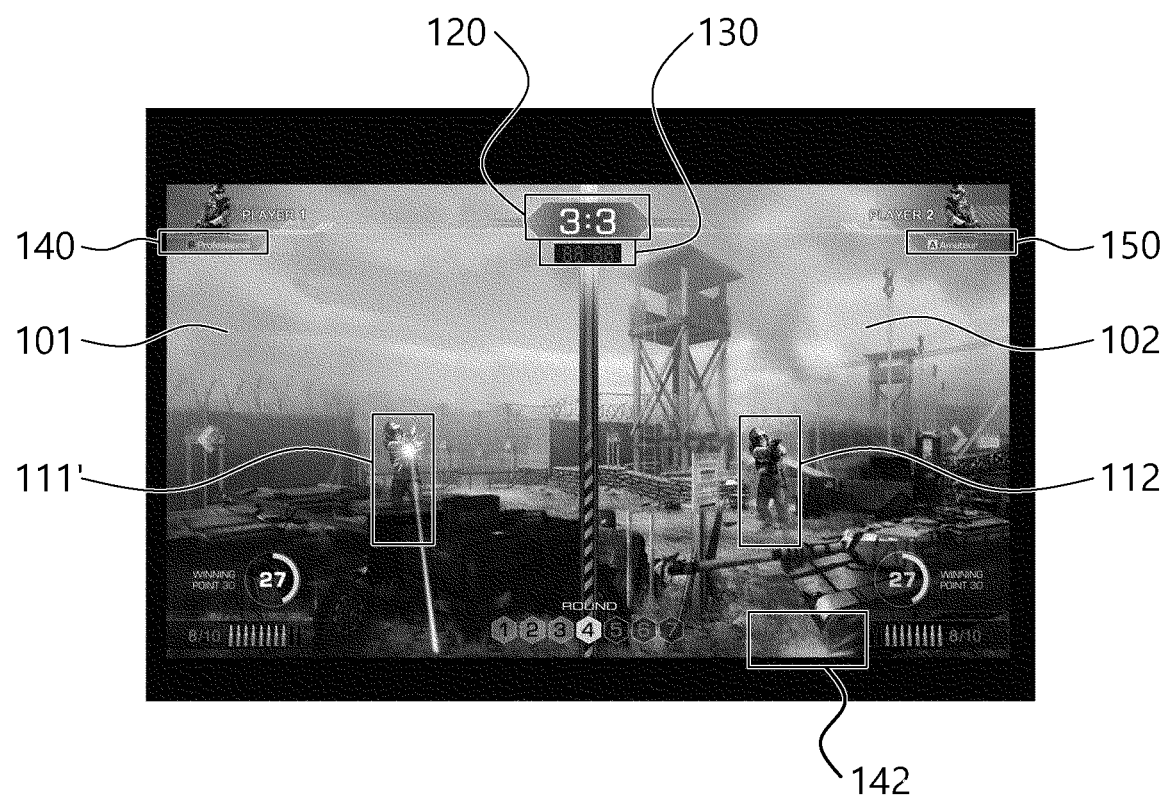

FIG. 3C illustrates a game screen when the second player shoots in the game state shown in FIG. 3A. According to the shooting of the second player, the display form of a second player character 111' displayed on the first player screen of the first player screen region 101 is changed, and an image in the form of a flame indicating shooting is displayed in a lower area 142 displayed on the second player screen of the second player screen region 102. Except for the fact that the player who fired is opposite, the operation in the game state shown in FIG. 3C may be easily understood from the operation described above with reference to FIG. 3B, and it will not be described in detail in order to avoid duplication of description.

Figure 3D:
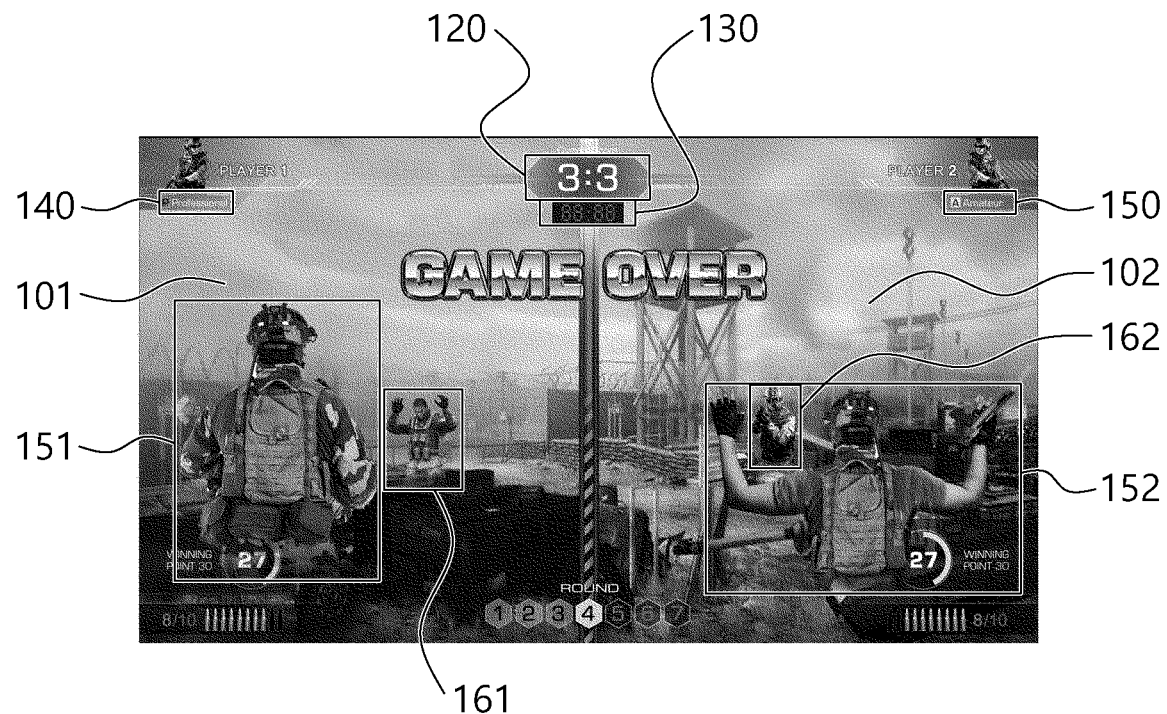

FIG. 3D is a game screen illustrating a case in which a specific player has reached the victory condition according to the game progress, and shows an exemplary game screen illustrating a case in which the first player has won. As shown in this drawing, an image in which a character 161 of the opponent second player surrenders is displayed on the screen region 101 of the winning first player, together with a back view of his or her character 151. On the other hand, a threatening type of image of a character 162 of the opponent first player is displayed on the screen region 102 of the defeated second player, together with the back view of his or her surrendered character 152. However, these are only an example, and when the victory condition is reached, the form of the game screen displayed to each player may be variously changed without particular limitation thereof.

Figure 4:
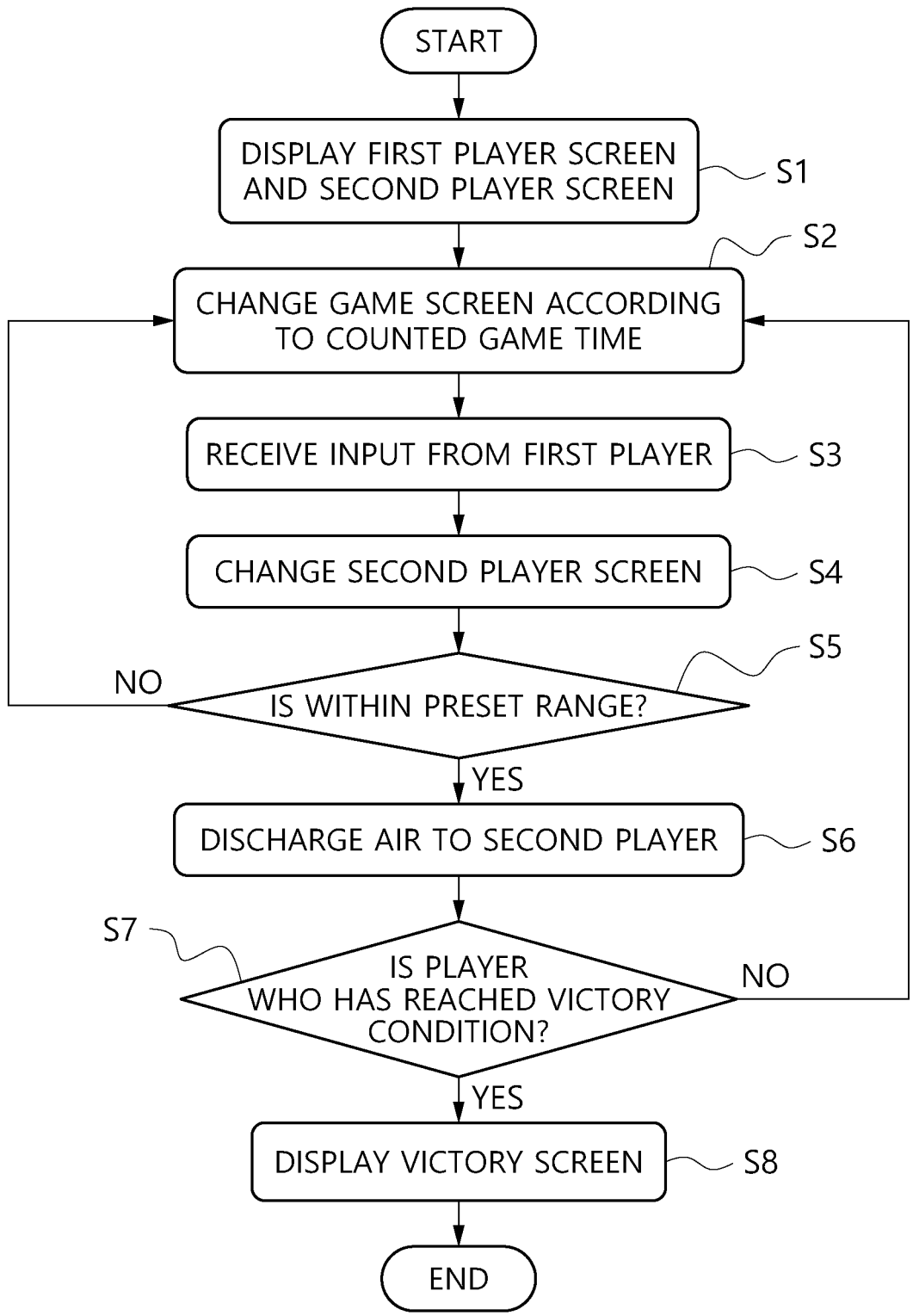
FIG. 4 is a flowchart illustrating each step of a method of operating a match-up game according to an embodiment of the present invention.

FIG. 4 is a flowchart illustrating each step of a method of operating a match-up game according to an embodiment of the present invention. For convenience of the description, the method of operating a match-up game according to the present embodiment will be described with reference to FIGS. 1 and 4.

First, when a game starts in the system for operating a match-up game, a game screen including a first player screen and a second player screen may be displayed on the first player screen region 101 and the second player screen region 102 of the display unit 10 (S1).

Next, the system for operating a match-up game may count the time after the game starts, and change the display form of the game screen on each of the player screen regions 101 and 102 according to the counted game time (S2). For example, as the game time progresses, it may be configured so that the distance between the respective player characters in the game is calculated to be decreased, and thereby the sizes of the opponent player characters displayed on the respective player screens of the player screen region 101 and 102 are increased as the game time elapses. However, in other embodiments, the distance between the characters may be manually changed by an operation of each player.

When receiving the input of the first player by the system for operating a match-up game while the game is in progress (S3), the system for operating a match-up game may change the second player screen displayed on the second player screen region 102 so as to correspond to a motion of the first player (S4). For example, when the first player shoots a second player character on the screen using the gun type controller 21, an image which is choreographed such that the character corresponding to the first player shoots a gun may be displayed on the second player screen of the second player screen region 102 corresponding to the attacked side.

At this time, the system for operating a match-up game determines whether the distance between the respective player characters in the game is within a preset range (S5), and if it is determined that the distance is within the preset range, air is discharged to the second player through the air outlet 32 (S6). This allows the second player to actually feel the fact that the second player's character was attacked in a tactile form such as air, as well as the conventional audio and visual means, thereby serving to enhance the immersion and tension of the player playing the match-up game.

Conversely, if the first player shoots but the distance is not within the range, the air is not discharged to the second player, and returns the processing to step S2 so as to play the game. However, this is only an example, and in other embodiments, it may be configured to discharge air to the opponent player whenever operations by a specific player are performed regardless of the range.

In the case of a match-up game of the gun shooting method, each player can acquire an in-game score by shooting the character of the opponent player. At this time, the system for operating a match-up game confirms whether there is a player who has reached a preset victory condition after each player shoots (S7), and if there is a player who has reached the victory condition, the game stops and a predetermined victory screen may be displayed on the display unit 10 (S8). If there is no player who has reached the victory condition, returns the processing to step S2 so as to play the game.

In the match-up game of the gun shooting method, the victory condition may be variously set according to the game characteristics, and it is not limited to a specific method. For example, when a match-up game is played in one or a plurality of rounds, and a player first obtains a set score (e.g., 30 points) for each round, it may be set for the round to end. In addition, after the end of each round, game result information such as the final score and the hit position of each player, as well as whether each player is a winner or a loser, may be displayed on the game screen. The above rounds may be performed until a player first wins a specific number (e.g., four times) of rounds.

For example, exemplary game rules according to the method of operating a match-up game according to an embodiment are shown in Table 1 below.

TABLE 1

| Classification | Contents |
| --- | --- |
| Game rule | A player who first wins four out of seven rounds finally wins the game |
| | Alternately, three wins out of five rounds, or two wins out of three rounds |
| | If no player has won four rounds, a player with the higher number of victories finally wins the game after performing the game up to a total of seven rounds. |
| Win condition for each round | A player who first achieves 100 points per round wins the game |
| Draw condition | No player has achieved 100 points by the end of the time, or each player's score is tied. |
| Game end condition | When a player reaches 100 points/When all players run out of bullets/When time ends |
| Extra time condition | If each player's score is tied, the game is performed in a sudden death method |
| Bullet payment | Pay 20 bullets per round |
| Game time | 30 seconds per round |

TABLE 1-continued

| Classification | Contents |
| --- | --- |
| Scoring rule | Head = 10 points/Trunk = 7 points/Limbs = 5 points depending on the hit body portion |
| Prize payment (optional) | Pay a prize to the winner |

However, the game rules described in Table 1 above are only an example, and the rules of the game played by the method for operating a match-up game according to embodiments are not limited to the above-described example.

The operation of the method for operating a match-up game according to the above-described embodiments may be implemented at least partially by a computer program, and may be recorded on a computer-readable recording medium. A recording medium on which a program for implementing the operation according to the method according to embodiments is recorded and the computer-readable recording medium includes all types of recording devices in which data that can be read by the computer is stored. Examples of the computer-readable recording medium include ROMs, RAMs, CD-ROMs, magnetic tapes, floppy disks, optical data storage devices and the like. In addition, the computer-readable recording medium may be distributed over a computer system connected through a network, such that computer-readable codes may be stored and executed in a distributed manner. In addition, functional programs, codes, and code segments for implementing the present embodiment will be easily understood by those skilled in the art to which the present invention pertains.

In addition, each block or each step shown in the flowchart of the present disclosure may represent a module, a segment, or a part of code that includes one or more executable instructions for executing specified logical function(s). Further, it is also possible, in some alternative embodiments, that the functions mentioned in the blocks or steps occur out of the above-described order. For example, two blocks or steps shown in succession may be substantially simultaneously performed in fact, or the blocks or steps may sometimes be performed in the reverse order depending on the corresponding function.

Although the present invention has been described with reference to the embodiments shown in the drawings, but these are merely an example. It should be understood by persons having common knowledge in the technical field to which the present invention pertains that various modifications and modifications of the embodiments may be made. And, such modifications are included in the technical protection scope of the present invention. Accordingly, the real technical protection scope of the present invention is determined by the technical spirit of the appended claims.

What is claimed is:

1. A system for operating a match-up game comprising:
a display unit which has a plurality of player screen regions configured to display game screens;
a first input unit configured to receive an input from a first player;
a second input unit configured to receive an input from a second player;
a first air outlet configured to discharge air to the first player;
a second air outlet configured to discharge air to the second player; and
a control unit configured to control the display unit to count a game time and change the game screens displayed on the player screen regions for each counted game time, and when receiving an input to the first input unit from the first player, control the second air outlet so as to discharge air corresponding to the received input,
wherein the control unit is further configured to increase a size of an area in which an opponent player is displayed on a game screen of a player screen region as the counted game time elapses.

2. The system for operating a match-up game according to claim 1, wherein the control unit is further configured to change one or more of a pressure, a volume, and a discharge radius of the air discharged through the second air outlet corresponding to the received input as the counted game time elapses.

3. The system for operating a match-up game according to claim 1, wherein the first input unit comprises a controller which is grasped by a player, and a sensor configured to measure a relative position of the controller with respect to the display unit, and
the control unit is further configured to change one or more of a pressure, a volume, and a discharge radius of the air discharged through the second air outlet, based on the relative position of the controller with respect to the display unit at the time of receiving the input by the first input unit.

4. The system for operating a match-up game according to claim 1, wherein the plurality of player screen regions comprise a first player screen region and a second player screen region, and
the control unit is further configured to change a display form of an opponent player on the second player screen region in response to receiving the input by the first input unit.

5. The system for operating a match-up game according to claim 1, wherein the control unit is further configured to change one or more of a pressure, a volume, and a discharge radius of the air discharged through the second air outlet corresponding to the input of the first player, based on a game difficulty in the system for operating a match-up game by the second player.

6. A method for operating a match-up game comprising:
displaying game screens on a plurality of player screen regions included in a display unit of a system for operating a match-up game;
counting a game time and changing the game screens displayed on the player screen regions of the display unit for each counted game time, by the system for operating a match-up game;
receiving, by the system for operating a match-up game, an input from a first player through an input unit of the system for operating a match-up game; and
discharging, by the system for operating a match-up game, air to a second player through an air outlet of the system for operating a match-up game corresponding to the input,
wherein the step of changing the game screens displayed on the player screen regions of the display unit comprises increasing, by the system for operating a match-up game, a size of an area in which an opponent player is displayed on a game screen of a player screen region as the counted game time elapses.

7. The method for operating a match-up game according to claim 6, wherein the step of discharging air to the second player comprises changing, by the system for operating a match-up game, one or more of a pressure, a volume, and a discharge radius of the air discharged through the air outlet corresponding to the received input as the counted game time elapses.

8. The method for operating a match-up game according to claim 6, wherein the input unit comprises a controller which is grasped by a player, and a sensor configured to measure a relative position of the controller with respect to the display unit, and the step of discharging air to the second player comprises changing, by the system for operating a match-up game, one or more of a pressure, a volume, and a discharge radius of the air discharged through the air outlet, based on the relative position of the controller with respect to the display unit at the time of receiving the input by the input unit.

9. The method for operating a match-up game according to claim 6, wherein the plurality of player screen regions comprise a first player screen region and a second player screen region, and further comprising changing, by the system for operating a match-up game, a display form of an opponent player on the second player screen region in response to receiving the input by the first input unit.

10. The method for operating a match-up game according to claim 6, further comprising receiving, by the system for operating a match-up game, a game difficulty from the second player, wherein the step of discharging air to the second player comprises changing, by the system for operating a match-up game, one or more of a pressure, a volume, and a discharge radius of the air discharged through the air outlet corresponding to the input of the first player, based on the input game difficulty.

11. A system for operating a match-up game comprising:
a display unit which has a plurality of player screen regions configured to display game screens;
a first input unit configured to receive an input from a first player;
a second input unit configured to receive an input from a second player;
a first air outlet configured to discharge air to the first player;
a second air outlet configured to discharge air to the second player; and
a control unit configured to control the display unit to count a game time and change the game screens displayed on the player screen regions for each counted game time, and when receiving an input to the first input unit from the first player, control the second air outlet so as to discharge air corresponding to the received input,
wherein the control unit is further configured to change one or more of a pressure, a volume, and a discharge radius of the air discharged through the second air outlet corresponding to the received input as the counted game time elapses.

12. The system for operating a match-up game according to claim 11, wherein the first input unit comprises a controller which is grasped by a player, and a sensor configured to measure a relative position of the controller with respect to the display unit, and the control unit is further configured to change one or more of a pressure, a volume, and a discharge radius of the air discharged through the second air outlet, based on the relative position of the controller with respect to the display unit at the time of receiving the input by the first input unit.

13. The system for operating a match-up game according to claim 11, wherein the plurality of player screen regions comprise a first player screen region and a second player screen region, and the control unit is further configured to change a display form of an opponent player on the second player screen region in response to receiving the input by the first input unit.

14. The system for operating a match-up game according to claim 11, wherein the control unit is further configured to change one or more of a pressure, a volume, and a discharge radius of the air discharged through the second air outlet corresponding to the input of the first player, based on a game difficulty in the system for operating a match-up game by the second player.

* * * * *